United States Patent
Pieper

(10) Patent No.: US 7,106,949 B1
(45) Date of Patent: Sep. 12, 2006

(54) METHOD AND APPARATUS FOR THE REPRODUCTION OF DIGITAL DATA STREAMS

(75) Inventor: Michael Pieper, Hannover (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/502,647

(22) Filed: Feb. 11, 2000

(30) Foreign Application Priority Data

Feb. 26, 1999 (DE) .................................. 199 08 488

(51) Int. Cl.
*H04N 5/91* (2006.01)
(52) U.S. Cl. ........................................ 386/95; 386/112
(58) Field of Classification Search .................. 386/46, 386/95, 98, 111, 112, 125, 126, 83; 370/535; 380/203

See application file for complete search history.

(56) References Cited

U.S. PATENT DOCUMENTS

| | | | |
|---|---|---|---|
| 5,619,337 A | 4/1997 | Naimpally | 386/83 |
| 5,682,384 A | 10/1997 | Zarros | 370/394 |
| 5,844,478 A | 12/1998 | Blatter et al. | 348/474 |
| 5,867,207 A | 2/1999 | Chaney et al. | 348/7 |
| 5,909,257 A * | 6/1999 | Ohishi et al. | 348/726 |
| 5,987,126 A * | 11/1999 | Okuyama et al. | 380/726 |
| 5,991,503 A * | 11/1999 | Miyasaka et al. | 386/111 |
| 6,185,228 B1* | 2/2001 | Takashimizu et al. | 370/535 |
| 6,445,872 B1* | 9/2002 | Sano et al. | 386/46 |

FOREIGN PATENT DOCUMENTS

| | | | |
|---|---|---|---|
| EP | 0749244 A2 | 12/1996 | |
| EP | 0782332 A2 | 7/1997 | |
| EP | 0782346 A1 | 7/1997 | |
| EP | 0855840 A1 | 7/1998 | |
| GB | 2 333 017 A | 7/1999 | |
| WO | WO97/46009 | 12/1997 | |

OTHER PUBLICATIONS

United States Advanced Television Systems Committee, *Digital Television Standard for HDTB Transmission*, ATSC Standard, Apr. 12, 1995, pp. 80, 81 and 82.

* cited by examiner

*Primary Examiner*—Huy Nguyen
(74) *Attorney, Agent, or Firm*—Joseph J. Laks; Ronald H. Kurdyla; Jeffrey M. Navon

(57) ABSTRACT

In DVB/MPEG transport streams, the PID specifies the assignment of the packets to the different elementary streams. For reproduction of the elementary streams, for instance by a set-top box with outputting via the screen of a television set, the packets of the desired program have to be selected from the transport stream by means of the PIDs using the demultiplexer. This requires in each case the evaluation of the Program Association Table and Program Map Table, and also that the PIDs of the elementary streams to be reproduced be known to the demultiplexer in the set-top box. If the set-top box has a digital interface via which parts of the transport data stream can be stored and reproduced later or via which an arbitrary transport data stream can be fed to the set-top box, the demultiplexer must firstly be reprogrammed with the PIDs. Reproduction simply by the pressing of a reproduction (play) button is possible according to the invention, however, by virtue of the fact that the PID for the packets of at least one of the data streams is set to a predetermined value in the set-top box, the packets with this predetermined value of the PID being selected for reproduction.

2 Claims, 1 Drawing Sheet

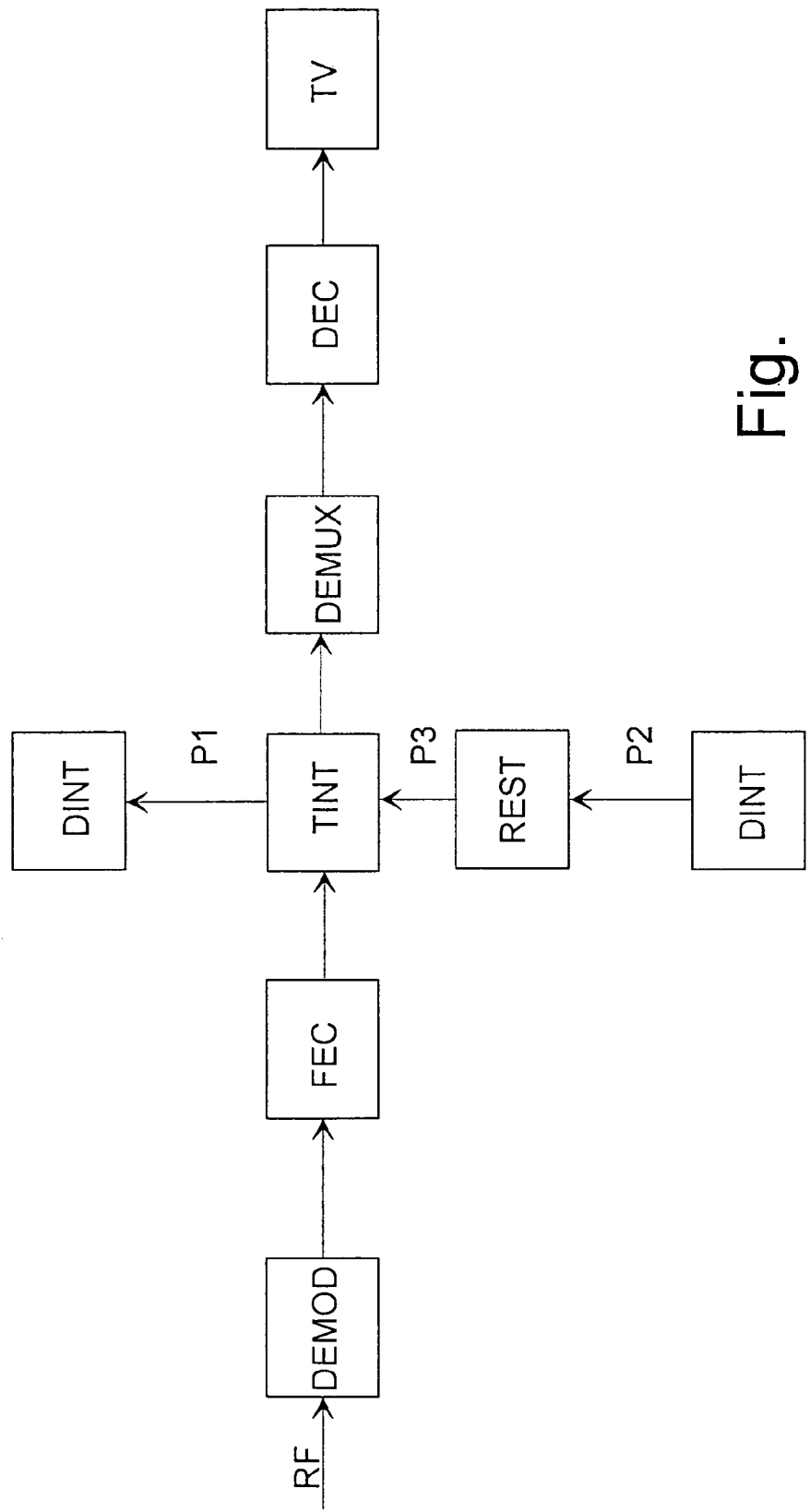

METHOD AND APPARATUS FOR THE REPRODUCTION OF DIGITAL DATA STREAMS

FIELD OF THE INVENTION

The invention relates to a method and an apparatus for the reproduction of digital data streams, in particular for the reproduction of MPEG data streams.

BACKGROUND OF THE INVENTION

Various methods are known for transmitting data-compressed bit streams. Such a method for the transmission of MPEG2 data has been specified in the specification MPEG2 Part 1: Systems (ISO/IEC DIS 13818-1). In this case, the coded data are not transmitted as a continuous stream but rather are subdivided into smaller information units, so-called packets. This formation of packets enables, on the one hand, the synchronization of data streams and, on the other hand, the joining together of a plurality of data streams to form a new data stream. Depending on the type of transmission and/or the application, the data are transmitted either in the program stream or in the transport stream. For radio-broadcasting transmission via cable, satellite or terrestrially, the transport stream is used since it has a particularly robust structure in the form of short packets. In this case, a transport packet is divided into a header comprising four bytes, optionally into an adaptation field, and furthermore into the area of the useful information. Thirteen bits of the header are used for the so-called packet identification. The packet identification (PID) in this case serves for assigning the packets to the different elementary streams, packets which belong to one and the same elementary stream having identical PIDs. The PIDs under which a corresponding decoder can find the individual packets within the transport stream are transmitted as part of the useful data in the form of tables. In this case, the Program Association Table specifies the number of programs contained in a transport stream and defines the assignment of the PID to the Program Map Table for each of the programs. The Program Map Table in turn contains a list of all PIDs for the elementary streams which are associated with the program assigned to the table.

For reproduction of the elementary streams, for instance by a set-top box with outputting via the screen of a television set, the packets of the desired program have to be selected from the transport stream by means of the PIDs using the demultiplexer. This requires in each case the evaluation of the Program Association Table and Program Map Table, and also that the PIDs of the elementary streams to be reproduced be known to the demultiplexer in the set-top box. If the set-top box has a digital interface via which parts of the transport data stream can be stored and reproduced later or via which an arbitrary transport data stream can be fed to the set-top box, the demultiplexer must firstly be reprogrammed with the respective PIDs after evaluation of the Program Association Table and Program Map Table. Reproduction simply by the pressing of a reproduction (play) button is thus not possible.

SUMMARY OF THE INVENTION

The invention is based on the object of specifying a method for the reproduction of digital data streams in which any desired data streams can be reproduced in a simple manner by means of a set-top box.

This object is achieved by means of the method specified in Claim 1.

The invention is based on the further object of specifying an apparatus for carrying out the method according to the invention. This object is achieved by means of the apparatus specified in Claim 4.

In principle, the invention's method for the reproduction of digital data streams, a plurality of data streams being joined together to form a transmission data stream for transmission and the data being grouped into packets, a packet containing, in addition to the useful information, a packet identification information, which specifies which data stream the packet is to be assigned to, consists in the fact that the packet identification information for the packets of at least one of the data streams is set to a predetermined value which differs from the original value, and that the packets with the predetermined value of the packet identification information are selected for reproduction.

In an advantageous manner, of the transmission data stream, using the packet identification information, one or more of the data streams are selected and recorded and, before the reproduction, of one of the data streams, the packet identification information is set to predetermined values.

The method shall preferably be applied if the transmission data stream is a DVB transport stream, for the change in value of the packet identification information first of all the Program Association Table and the Program Map Table are evaluated and the packet identification information of video, audio and PCR packets is set to predetermined values.

In principle, the invention's apparatus for the reproduction of digital data streams has an input for a transport data stream, a demultiplexer for selecting data streams from the transport data stream, a decoder for decoding the data contained in the data streams, and an output for outputting the decoded data to a reproduction apparatus, as well as a transport stream interface, via which the transport data stream can be read in and/or output in its entirety or partially, and a unit for restamping the packet identification information, by means of which the packet identification information for the packets of at least one of the data streams is set to a predetermined value which differs from the original value, where the demultiplexer selects the packets with the predetermined value of the packet identification information for reproduction.

Preferably, a digital interface in accordance with the IEEE 1394 Standard is additionally provided, which is connected to the transport stream interface, the digital interface converting the transport data stream into the IEEE 1394 format.

BRIEF DESCRIPTION OF THE DRAWING

An exemplary embodiment of the invention is described with reference to the FIGURE, which shows a simplified block diagram of the apparatus according to the invention.

DETAILED DESCRIPTION OF PREFERRED EMBODIMENTS

The FIGURE illustrates one possible embodiment of an apparatus according to the invention. A received television signal RF is first of all fed to a demodulator DEMOD in the analog front end. The demodulation depends on the modulation method used and thus on the respective transmission channel. In the case of satellite transmission, QPSK modulation and demodulation, in particular, are considered in this context. The demodulated signals are fed firstly to error correction EDC and then to a transport stream interface TINT. The transport stream interface TINT filters one or more programs, according to the user's stipulation, out of the transport stream for recording on a disc- or tape-based digital storage medium, e.g. a hard disk. This can be done by the inputting of the associated PID numbers of the program or programs. Likewise, the selection may alternatively be made using a suitable menu displayed on the screen of the TV set TV. The transport stream P1 for the selected programs is then fed via a suitable digital interface DINT, which corresponds e.g. to the IEEE 1394 Standard, to a storage device (not illustrated here), e.g. a hard disk or a D-VHS recorder, and is recorded there. For a later reproduction of the stored data stream, the latter is first of all read in from the storage device via the digital interface DINT and fed as a transport data stream P2 to the restamp unit REST. In this case, if there are a plurality of recorded programs, it is necessary first of all to select the desired program or the desired transmission. The corresponding PID numbers for audio and video data and PCR are then determined for the desired program by means of the Program Association Table and the Program Map Table. Transport stream packets with the PID numbers determined are then restamped by the restamp unit REST, that is to say the packet identification in the header of the respective transport packets is changed to fixed numbers known to the system. The restamped transport stream P3 is then fed to the demultiplexer DEMUX via the transport stream interface TINT. The demultiplexer DEMUX then no longer has to evaluate the Program Association Table and Program Map Table for reproduction of the recorded data stream, since the same PID numbers are always present due to the restamping by means of the restamp unit REST, but rather can forward the data stream directly to the MPEG2 decoder DEC. After decoding, display on the screen of the TV set TV can then be effected. For this purpose, the TV set may be connected to the set-top box e.g. by means of a SCART cable.

The restamp unit REST is preferably integrated in a set-top box, but may likewise be integrated in a recording device such as, for instance, a digital video recorder, a DVD-RAM or in the TV set.

The invention may be used for example in the context of a so-called TV memory function. The latter enables reproduction staggered over time in the following manner. In the event of an interruption during the viewing of a television program, e.g. due to a telephone call, the user initiates a command e.g. by pressing a corresponding button on the remote control, which leads to the storage of the subsequent program parts. For this purpose, the transport stream is output via the transport interface TINT and the digital interface DINT to a recording device, e.g. an integrated hard disk, and is recorded on the latter. Once the interruption has ended, the user issues a further command to initiate time-staggered reproduction of the recorded program starting at the point of interruption, and the program simultaneously continues to be recorded, e.g. until the end of the transmitted broadcast. Thus, simultaneously, the stored transport stream is read in via the digital interface DINT and the transport stream interface TINT and the transport stream currently being received is output via the same interfaces. In the case of the transport stream that is read in, the PIDs are in this case restamped in the manner described above.

What is claimed is:

1. Method for the reproduction of digital data streams, comprising:

receiving a plurality of data streams being joined together in form of a DVB transport stream, data of the data streams being grouped into packets, and a packet containing in addition to video, audio or PCR information a packet identification information for specifying which data stream the packet is assigned to;

selecting one or more of the data streams of the DVB transport stream using the packet identification information;

recording the selected one or more data streams with unchanged packet identification information;

evaluating a Program Association Table and a Program Map Table within the recorded one or more data streams for determining the packet identification information of at least one of the video, audio and PCR Packets of at least one of the recorded one or more data streams;

setting subsequent to the recording and before the reproduction of one of the data streams the determined packet identification information to a predetermined value which differs from the original value; and selecting packets with the set predetermined value of the packet identification information for reproduction.

2. Apparatus for the reproduction of digital data streams, comprising:

means for receiving a plurality of data streams being joined together in form of a DVB transport stream, data of the data streams being grouped into packets, and a packet containing in addition to video, audio or PCR information a packet identification information for specifying which data stream the packet is assigned to;

means for selecting one or more of the data streams of the DVB transport stream using the packet identification information;

means for recording the selected one or more data streams with unchanged packet identification information;

means for evaluating a Program Association Table and a Program Map Table within the recorded one or more data streams for determining the packet identification information of at least one of the video, audio and PCR packets of at least one of the recorded one or more data streams;

means for setting subsequent to the recording and before the reproduction of one of the data streams the determined packet identification information to a predetermined value which differs from the original value; and means for selecting packets with the set predetermined value of the packet identification information for reproduction.

* * * * *